US011948785B2

(12) United States Patent
Wakhle et al.

(10) Patent No.: US 11,948,785 B2
(45) Date of Patent: Apr. 2, 2024

(54) ELECTRON MULTIPLIERS HAVING IMPROVED GAIN STABILITY

(71) Applicant: ADAPTAS SOLUTIONS PTY LTD, Clyde (AU)

(72) Inventors: Aditya Wakhle, Clyde (AU); Russell Jurek, Clyde (AU); Kevin Hunter, Clyde (AU)

(73) Assignee: ADAPTAS SOLUTIONS PTY LTD, Clyde (AU)

( * ) Notice: Subject to any disclaimer, the term of this patent is extended or adjusted under 35 U.S.C. 154(b) by 0 days.

(21) Appl. No.: 18/041,462

(22) PCT Filed: Aug. 10, 2021

(86) PCT No.: PCT/AU2021/050874
§ 371 (c)(1),
(2) Date: Feb. 13, 2023

(87) PCT Pub. No.: WO2022/032335
PCT Pub. Date: Feb. 17, 2022

(65) Prior Publication Data

US 2023/0298873 A1 Sep. 21, 2023

(30) Foreign Application Priority Data

Aug. 14, 2020 (AU) ................................ 2020902902

(51) Int. Cl.
*H01J 43/22* (2006.01)
*H01J 43/12* (2006.01)
*H01J 43/24* (2006.01)

(52) U.S. Cl.
CPC .............. *H01J 43/22* (2013.01); *H01J 43/12* (2013.01); *H01J 43/24* (2013.01)

(58) Field of Classification Search
CPC ............. H01J 43/22; H01J 43/12; H01J 43/24
See application file for complete search history.

(56) References Cited

U.S. PATENT DOCUMENTS

| | | | | |
|---|---|---|---|---|
| 4,093,562 | A * | 6/1978 | Kishimoto .............. | H01J 43/24 252/514 |
| 6,060,839 | A * | 5/2000 | Sverdrup, Jr. .......... | H01J 43/02 345/55 |
| 2020/0027709 | A1 * | 1/2020 | Nagata .................. | H01J 43/246 |

FOREIGN PATENT DOCUMENTS

| | | | |
|---|---|---|---|
| FR | 2567682 | A1 | 7/1984 |

OTHER PUBLICATIONS

International Search Report dated Sep. 9, 2021 for corresponding International Application No. PCT/AU2021/050874, filed Aug. 10, 2021.

(Continued)

*Primary Examiner* — Mary Ellen Bowman
(74) *Attorney, Agent, or Firm* — David D. Brush; Westman, Champlin & Koehler, P.A.

(57) ABSTRACT

The present invention relates to electron multiplier apparatus of the type used in ion detectors. In one form, the invention is an electron multiplier having two or more electron emissive surfaces, each having a different composition so as to together limit or overcome an acute gain effect on the electron multiplier due to the exposure of the two or more electron emissive surfaces to water molecules. Alternatively, the multiplier may have a single electron emissive surface of mixed composition comprising a first composition component and a second composition component so as to together limit or overcome an acute gain effect on the electron multiplier due to the exposure of the electron emissive surface to water molecules.

20 Claims, 2 Drawing Sheets

(56) References Cited

OTHER PUBLICATIONS

Written Opinion of the International Searching Authority dated Sep. 9, 2021 for corresponding International Application No. PCT/AU2021/050874, filed Aug. 10, 2021.
Ovchinnikov, B. M. et al., "Gas Electron Multiplier detectors with high reliability and stability", arXiv preprint arXiv:1012.4716 (2010).
Tao, S. X. et al., "Secondary Electron Emission Materials for Transmission Dynodes in Novel Photomultipliers: A Review", Materials 9.12 (2016):1017.

* cited by examiner

ELECTRON MULTIPLIERS HAVING IMPROVED GAIN STABILITY

CROSS-REFERENCE TO RELATED APPLICATIONS

This Application is a Section 371 National Stage Application of International Application No. PCT/AU2021/050874, filed Aug. 10, 2021, which is incorporated by reference in its entirety and published as WO 2022/032335 A1 on Feb. 17, 2022, in English.

FIELD OF THE INVENTION

The present invention relates generally to components of scientific analytical equipment. More particularly, the invention relates to electron multiplier apparatus of the type used in ion detectors, and improvements thereto in respect of gain stabilization.

BACKGROUND TO THE INVENTION

In basic terms, an electron multiplier functions to amplify an input signal. The input may be very low, such as a single ion output by a mass spectrometer. In order to have a high level of sensitively an electron multiplier must be constructed and operated at sufficiently high voltages to provide the high gains required to derive an output signal from a single ion.

A typical discrete-dynode electron multiplier has between 12 and 24 dynode stages, and is used at an operating gain of between 104 and 108, depending on the application. In GC-MS applications, for example, the electron multiplier is typically operated in analog mode with a gain of around 105. For a new electron multiplier this gain is typically achieved with an applied high voltage of ~1400 volts.

Over the operational lifetime of an electron multiplier, the gain will chronically decrease over months and years due to general deterioration in the ability of the electron emissive surfaces to emit secondary electrons. To some extent, the decline in gain is predictable and can be accounted for where necessary. For example, the operating voltage applied to a dynode may be increased to offset the overall decline in multiplier gain.

Separate to chronic gain decline is the acute gain instability often seen in electron multipliers, manifesting as a relatively rapid decrease in gain over shorter time periods of minutes, hours and days. A 10-fold decrease in gain during the first 90 minutes of detector operation is not uncommon for many electron multipliers. Given the transience of the gain instability, it is generally not possible to vary voltage or any other parameters so as to obtain a stable gain. To address the issue, it is common to allow a period of time to allow the multiplier to stabilise before use. This is of course is adverse to productivity, and in any event the multiplier gain might not even stabilise completely.

The cause of acute gain instability is simply not understood by prior artisans, and accordingly no effective means of overcoming the problem has been previously proposed.

It is an aspect of the present invention to identify a cause for acute gain instability in electron multipliers. In addition or alternatively, an aspect of the invention is to provide an improvement to prior art electron multipliers so as to improve acute gain stability whether or not that improvement relates to any identified cause. It is yet a further aspect of the present invention to provide a useful alternative to prior art electron multipliers.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

In a first aspect, but not necessarily the broadest aspect, the present invention provides an electron multiplier having: two or more electron emissive surfaces, a first of the two or more electron emissive surfaces having a first composition, a second of the two or more electron emissive surfaces having a second composition, wherein the first and second compositions differ so as to together limit or overcome an acute gain effect on the electron multiplier due to the exposure of the two or more electron emissive surfaces to water molecules, and/or a single electron emissive surface of mixed composition comprising a first composition component and a second composition component, wherein the first and second composition components differ so as to together limit or overcome an acute gain effect on the electron multiplier due to the exposure of the electron emissive surface to water molecules.

In one embodiment of the first aspect, when the two or more electron emissive surfaces are exposed to water molecules the secondary electron yield of the first electron emissive surface increases, and the secondary electron yield of the secondary electron emissive surface decreases, and/or wherein when the single electron emissive surface is exposed to water molecules the secondary electron yield contributed by the first composition component increases and the secondary electron yield of the second composition component decreases.

In one embodiment of the first aspect, the magnitude of the increase and the magnitude of the decrease in secondary electron yields of the first and second electron emissive surfaces respectively lessens or cancels the acute gain effect of the electron multiplier due to exposure of the first and second electron emissive surfaces to water molecules, and/or wherein the magnitude of the increase and the magnitude of the decrease in secondary electron yields of the first and second composition components respectively lessens or cancels the acute gain effect of the electron multiplier due to exposure of the first and second composition components to water molecules.

In one embodiment of the first aspect, in the absence of water molecules the secondary electron yield of the first and second electron emissive surfaces are about equivalent, and/or wherein in the absence of water molecules the secondary electron yield of the first and second composition components are about equivalent.

In one embodiment of the first aspect, wherein in the absence of water molecules the secondary electron yield of the first and second electron emissive surfaces are about equivalent, and/or wherein in the absence of water molecules the secondary electron yield contribution of the first and second composition components are about equivalent.

In one embodiment of the first aspect, when the two or more electron emissive surfaces are exposed to water molecules the work function of the first electron emissive surface decreases, and the work function of the second electron emissive surface increases, and/or wherein when the single electron emissive surface is exposed to water molecules the work function component contributed by the first composition component decreases and the work function of the second composition component increases.

In one embodiment of the first aspect, the magnitude of the decrease and the magnitude of the increase in work functions of the first and second electron emissive surfaces respectively lessens or cancels the acute gain effect of the electron multiplier due to exposure of the first and second electron emissive surfaces to water molecules, and/or wherein the magnitude of the decrease and the magnitude of the increase in secondary electron yields of the first and second composition components respectively lessens or cancels the acute gain effect of the electron multiplier due to exposure of the first and second composition components to water molecules.

In one embodiment of the first aspect, in the absence of water molecules the work functions of the first and second electron emissive surfaces are about equivalent, and/or wherein in the absence of water molecules the work function contribution of the secondary electron yield of the first and second composition components are about equivalent.

In one embodiment of the first aspect, the first composition has a high electron negativity and/or a high electron affinity as compared with the second composition, and/or wherein the first composition component has a high electron negativity and/or a high electron affinity as compared with the second composition component.

In one embodiment of the first aspect, the first composition and/or the first composition component is a metal or a silicon-based glass.

In one embodiment of the first aspect, the metal or the silicon-based glass is oxidized.

In one embodiment of the first aspect, the metal is stainless steel, aluminium, beryllium copper or gold.

In one embodiment of the first aspect, the second composition and/or the second composition component is a non-metal.

In one embodiment of the first aspect, the second composition has a low electron negativity and a low electron affinity as compared with the first composition; and/or the second composition component has a low electron negativity and a low electron affinity as compared with the first composition component.

In one embodiment of the first aspect, the second composition and/or the second composition component is a semiconductor including diamond, or a diamond-like carbon.

In one embodiment of the first aspect, the semiconductor, the diamond or the diamond-like carbon is doped and/or hydrogen-terminated.

In one embodiment of the first aspect, the doping agent is boron.

In one embodiment of the first aspect, the acute gain effect is an increase or decrease in gain over a period of less than about 10, 20, 30, 40, 50, 60, 70, 80, 90, 100, 110 or 120 minutes.

In one embodiment of the first aspect, the increase or decrease in gain is at least about 1.5-fold, 2-fold, 3-fold, 4-fold, 5-fold, 6-fold, 7-fold, 8-fold, 9-fold, or 10-fold.

In one embodiment of the first aspect, the electron is configured as a discrete dynode electron multiplier, wherein the first electron emissive surface is provided by a first dynode and the second electron emissive surface is provided by a second dynode.

In one embodiment of the first aspect, the electron multiplier comprises a plurality of dynodes wherein the ratio of first emissive surfaces to second emissive surfaces is set so as to limit or overcome an acute gain effect on the electron multiplier due to the exposure of the electron emissive surface to water molecules.

In one embodiment of the first aspect, the electron multiplier is configured as a multi-channel electron multiplier, wherein the first electron emissive surface is provided by a first channel and the second electron emissive surface is provided by a second channel.

In one embodiment of the first aspect, the electron multiplier comprises a plurality of channels wherein the ratio of first emissive surfaces to second emissive surfaces is set so as to limit or overcome an acute gain effect on the electron multiplier due to the exposure of the electron emissive surface to water molecules.

In one embodiment of the first aspect, the electron multiplier is configured to amplify a signal using one, two or several electron emissive surfaces, wherein each of the one, two or several electron emissive surfaces comprises the first composition component and the second composition component.

In one embodiment of the first aspect, the ratio of the first composition component to the second composition component is set so as to limit or overcome an acute gain effect on the electron multiplier due to the exposure of the electron emissive surface(s) to water molecules.

The two embodiments immediately supra, may allow application of the present invention to a single channel, continuous electron multiplier or a magneTOF.

BRIEF DESCRIPTION OF THE FIGURES

Unless otherwise indicated herein, features of the drawings labelled with the same numeral are taken to be the same features, or at least functionally similar features, when used across different drawings.

Figure 1A:
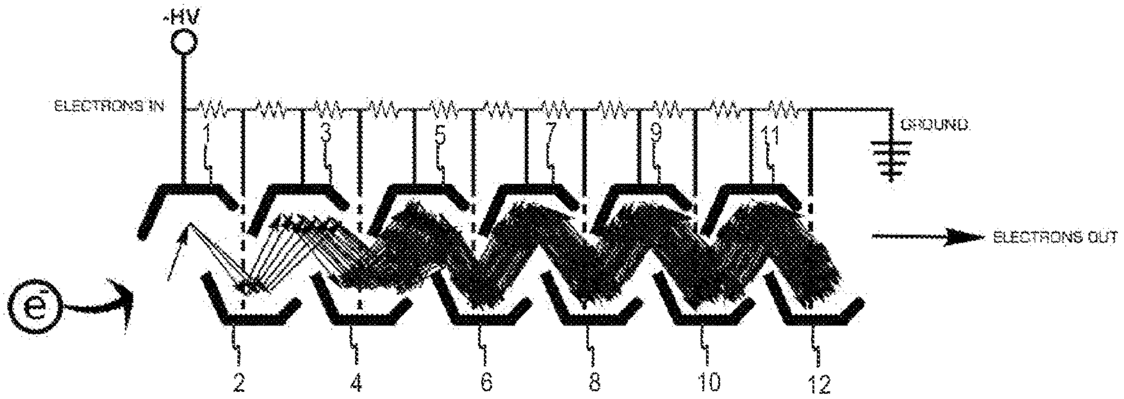
FIG. 1A is a schematic diagram of a 12 dynode discrete dynode electron multiplier having dynodes fabricated from standard electron emissive materials and compensatory electron emissive materials.

The drawings are not prepared to any particular scale or dimension and are not presented as being a completely accurate presentation of the various embodiments.

DETAILED DESCRIPTION OF THE INVENTION AND PREFERRED EMBODIMENTS THEREOF

After considering this description it will be apparent to one skilled in the art how the invention is implemented in various alternative embodiments and alternative applications. However, although various embodiments of the present invention will be described herein, it is understood that these embodiments are presented by way of example only, and not limitation. As such, this description of various alternative embodiments should not be construed to limit the scope or breadth of the present invention. Furthermore, statements of advantages or other aspects apply to specific exemplary embodiments, and not necessarily to all embodiments, or indeed any embodiment covered by the claims.

Throughout the description and the claims of this specification the word "comprise" and variations of the word, such as "comprising" and "comprises" is not intended to exclude other additives, components, integers or steps.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may.

While the terms "gain", "secondary electron yield", and "work function" each have discrete meanings in the art, in the context of the present invention a functional connection may exist between any two or all three terms. The functional connection may, in some contexts, means that any two or all three terms are essentially interchangeable. An aim of the present invention is the acute stabilisation of gain in an electron multiplier. The term "gain" when used in the context of an electron emissive surface means a level of signal amplification. The level of signal amplification is in turn proportional to the secondary electron yield of the surface (i.e. the number of electrons that are emitted as a result of impact of a single charged particle on the surface). While secondary electron yield is a function of a number of parameters, one parameter is the work function of the emissive surface (a lower work function providing for a higher secondary electron yield). In that regard, where the term "gain" is used it may be considered in some contexts that any change in gain has its origins in a change in secondary electron yield and/or a change in the work function of the electron emissive surface concerned.

The present invention is predicated at least in part on the inventors' discovery that acute gain instability is caused at least in part by the presence of water in the vacuum chamber in which an electron multiplier is operated. Experimental data disclosed in the Examples section herein prove that the presence of water on or about the electron emissive surface is the predominant cause of acute gain instability.

Without wishing to be limited by theory in any way, it is proposed that water molecules contact or localise about the electron emissive surface(s) of a multiplier thereby altering the primary function of the surface(s) (i.e. the emission of secondary electrons in response to impact of a particle). More specifically, it is proposed that the work function of the electron emissive surface(s) is modified by the presence of water molecules on the surface. Modification of emissive service work function either increases or decreases the gain of the multiplier depending on whether the work function is decreased (increasing the gain) or increased (decreasing the gain).

Work function may be considered as the minimum energy required to remove an electron from a solid (such as a dynode) to a point in the vacuum immediately outside the solid surface.

Work function may be considered in terms of the energy required to liberate an electron from its bound state and make it a 'free electron'. In that case, the bound state is being attached to the bulk atoms or the surface atoms of an object. Interactions with neighbouring atoms in an object will modify the work function, similar to water molecules on the surface, so the bulk and surface atoms will typically have different work functions. In some materials the differences are so small as to be negligible.

In practice, work functions are typically only measurable for the material surface. In attempting to measure the minimum energy required to 'free' an electron, it is generally ensured that the method does not provide any of the 'excess' energy that a 'free' electron generated in the bulk requires to escape through the bulk and surface. Hence the measured work functions for materials are typically considered as a property of the surface, but technically, from a pure definition perspective, the bulk material may be considered to have a work function as well.

Relevant to the 'bulk property' of a material is the 'escape volume'. The escape volume may be considered as the volume inside the bulk material where secondary electrons originate. The escape volume is dependent upon the velocity of the incident electron/ion, geometry of the bulk material, atom-atom interactions and the bulk work function. It's basically how we describe the work function + the energy required for 'free' electrons to escape the bulk and surface.

Electron impacts on the emissive surface(s) removes the water molecules from the surface(s), and the gain at these locations then reverts to the 'native' gain seen in the absence of water molecules. This reversion to native gain manifests as the acute change in electron multiplier gain that is empirically observed during normal operation of a commercially available electron multiplier.

Modification of work function will therefore affect the relative ease or difficulty with which a secondary electron can be emitted from an emissive surface. In turn, the secondary electron yield of the electron emissive surface is altered: where work function is increased an electron will be emitted with greater difficulty (i.e. more energy will be required), and where work function is decreased an electron will be emitted with lesser difficulty (i.e. less energy will be required).

Even small changes in the work function leads to changes in secondary electron yield for an emissive surface. The change in emissivity over the one or more surfaces of an electron multiplier can significantly affect the overall gain of the multiplier. As will be understood, electron multiplier gain is the geometric compounding of the secondary electron yield (i.e. gain) arising from electron impact with each emissive surface, or with each electron "bounce" along a single emissive surface.

It is proposed that alteration in secondary electron yield (and therefore gain) is a short-term effect (i.e. causing acute gain instability, as distinct from persistent gain instability) because the electron impacts and/or the emission of secondary electrons remove water molecules from the emissive surface. This proposed mechanism predicts that the alteration of gain is largest initially when greater amounts of water are present, and accordingly greater amounts of water are removed per unit time. As such, alteration of diminishes increasingly slowly as bulk amounts of water are removed early leaving smaller and smaller amounts of water as time progresses. This proposed mechanism provides that acute gain instability due to water will follow a monotonic regression to the long-term persistent gain instability caused by general ageing of the electron multiplier. Reference is made to Example 1 infra, detailing experimental support for the proposed mechanism.

In the context of the present invention, the origin of any water on or about an electron emissive surface is immaterial. Similarly the means by which any water on or about an electron emissive surface is removed is immaterial. In many circumstances, however, any water will be of atmospheric origin and present in the vacuum about and deposited on electron emissive surfaces.

Having found an indication that the gradual removal of water from the emissive surface(s) of an electron multiplier is a cause of acute gain instability in an electron multiplier, the further problem of how to overcome or ameliorate the instability was faced.

It is proposed that the problem of acute gain instability may be addressed by configuring an electron multiplier to comprise electron emissive surfaces that react generally oppositely when exposed to water. For example the work function of one surface may increase when exposed to water, while the work function of another surface may decrease when exposed to water. As another example, the secondary electron yield of one surface may increase when exposed to water, while the secondary electron yield of another surface may decrease when exposed to water. As another example, the gain of one surface may increase when exposed to water, while the gain of another surface may decrease when exposed to water. Conversely, for example, the work function of one surface may increase when any water is removed, while the work function of another surface may decrease when any water is removed. As another example, the secondary electron yield of one surface may increase when any water is removed, while the secondary electron yield of another surface may decrease when any water is removed. As another example, the gain of one surface may increase when any water is removed, while the gain of another surface may decrease when any water is removed.

In these regards, one electron emissive surface may be considered as "compensatory" of another in so far as, for example, a decrease in gain in one surface (caused by exposure to water) is counteracted at least in part by an increase in gain in another surface (caused by exposure to about the same amount of water). It will be understood that one surface need not precisely compensate for another surface. For example, it is not an essential feature of the invention that a surface showing a 10% decrease in gain when water is removed is paired with a compensatory surface showing a 10% increase in gain when water is removed. Even where an electron multiplier includes emissive surfaces that provide for less than perfect compensation overall, advantage may nevertheless be gained in so far as some improvement in gain stability results.

To further explain the general principle of the present invention, reference is made to the exemplary embodiment of FIG. 1A being a 12 dynode discrete dynode electron multiplier. Structurally, the multiplier of FIG. 1A is no different to a prior art multiplier. The advance lies in the use of two different types of dynode with each of the two types having a certain electron emissive surface. The combination of emissive surfaces is such that acute gain instability is completely negated. Dynodes 1, 3, 5, 7, 9 and 11 are all fabricated from the same standard dynode material of the type that decreases in secondary electron yield upon exposure to water. The surfaces of dynodes 2, 4, 6, 8, 10 and 12 are formed from a compensatory material which increases in secondary electron yield in response to the removal of water.

Figure 1B:
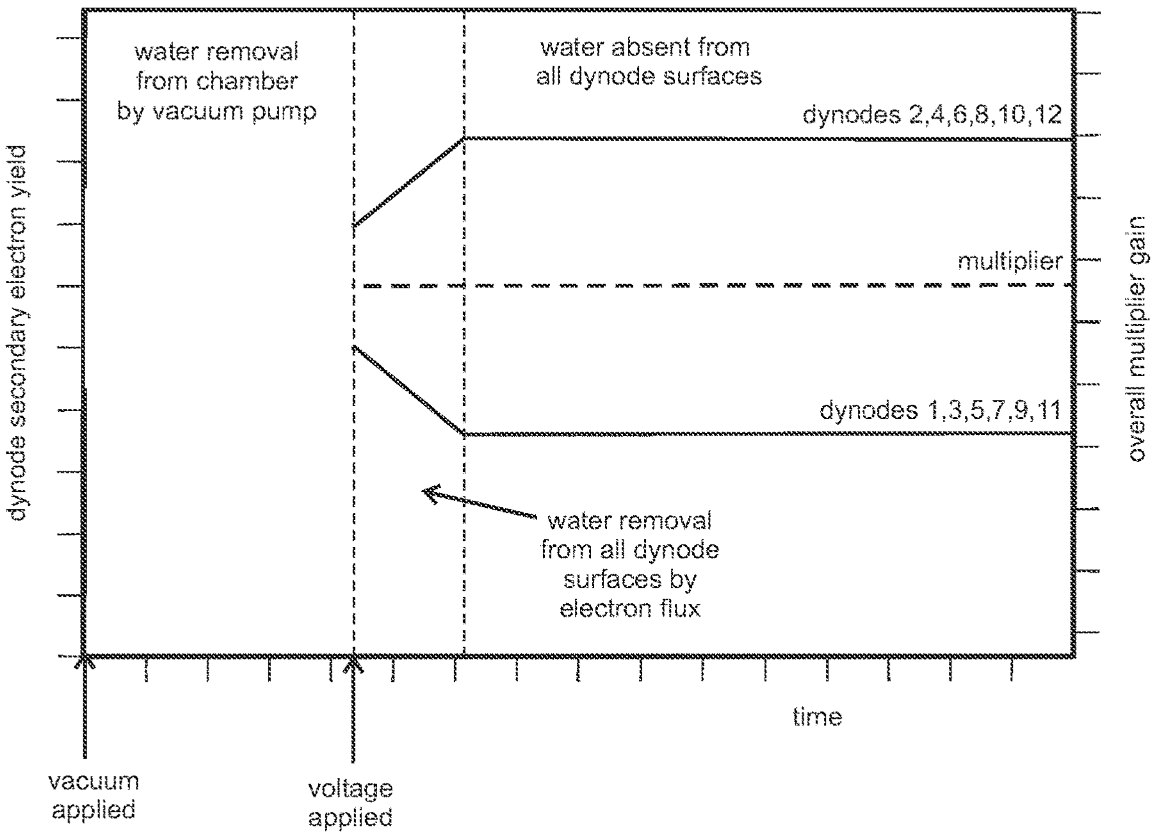
FIG. 1B is a graph of demonstrating the response of each dynode of electron multiplier of FIG. 1A to the removal of water, and the net negation of acute gain instability in the multiplier.

The graph of FIG. 1B illustrates how the secondary electron yield for each of dynodes 1, 3, 5, 7, 9 and 11 decreases when voltage is applied, while the yield for each of dynodes 2, 4, 6, 8, 10 and 12 increases by the same amount and according to the same kinetics. From the time vacuum is first applied to the chamber holding the electron multiplier, atmospheric water is being consistently removed. However when full vacuum is achieved and voltage is applied to the multiplier, small amounts of water are still present in the chamber and accordingly all dynode surfaces are contacted with water. That remaining water is removed from the dynode surfaces by the electron flux which arises from the application of voltage. As will be noted, removal of water due to electron flux causes yield of standard dynodes 1, 3, 5, 7, 9 and 11 to decrease. In the absence of any compensatory dynodes that decrease would manifest as acute gain instability. However, the yield of dynodes 2, 4, 6, 8, 10 and 12 increases by the same magnitude in response to removal of water thereby negating the gain instability that would result where only standard dynodes are used. Accordingly, as shown by the dashed line the multiplier gain remains stable once all water is removed from the dynodes.

Of course, the graph of FIG. 1B is an idealized representation to demonstrate the principle of operation of the present invention. It is not suggested that perfect acute gain stability is necessarily achievable.

It is not an essential feature of the invention that compensatory gain effects are considered with reference to pairs of surfaces. Compensation for gain instability may result from the combination of 2, 3, 4, 5, 6, 7, 8, 9 or 10 electron emissive surfaces. As an example of 3 compensatory surfaces, a first surface may show a 10% increase in gain when water is removed, a second surface may show a 5% increase in gain when water is removed, a third surface may show a 5% increase in gain when water is removed. The net result of the combination of 3 such surfaces is a perfect compensation and therefore complete negation of acute gain instability.

It is contemplated that combinations of 2, 3, 4, 5, 6, 7, 8, 9 or 10 different electron emissive surface may be used in order to obtain the required compensatory effect and therefore gain stability. The various combinations may be used in any ratio(s) deemed suitable by the skilled person having the benefit of the present specification.

In preferred embodiments the electron emissive surfaces are configured so as to provide compensation for acute gain instability such that at any point in the acute period (for example 10 min, 20 min, 30 min, 40 min, 50 min, 60 min, 2 hours, or 3 hours) the gain does not deviate any more than about 1%, 2%, 3%, 4%, 5%, 6%, 7%, 8%, 9%, 10%, 20%, 30%, 40%, or 50% from an initial gain.

It is preferred that the kinetics of change in gain for each electron emissive surface is the same or similar in response to exposure to and/or removal of water. By this arrangement, the surfaces will change gain over time in the same or similar manner such that the compensation is temporally uniform or close to uniform. It is proposed that water is removed from or about an electron emissive surface by electron flux, and accordingly the surfaces may be selected on the basis of water removal kinetics in response to electron flux.

In seeking to design an electron multiplier having improved acute gain stability, consideration is given to the materials that form the electron emissive surfaces. Of course, the materials must provide for sufficient secondary electron yield however in the context of the invention consideration must also be given to how the materials respond to the presence or absence of water. In that regard, the materials may be any of those ordinarily used as electron emissive surfaces in dynodes such as stainless steel, metal oxides (including MgO, Cu—BeO, $Al_2O_3$), gold, and silicon-based glasses. These materials typically have a relatively high electron-negativity and/or a high electron affinity and when exposed to water, the secondary electron yield increases acutely. Conversely, when water is removed (such as by electron flux through the multiplier that occurs during operation) electron yield of each emissive surface decreases acutely.

Materials that can compensate for standard materials behave oppositely to standard materials; i.e. when exposed to water the secondary electron yield decreases and when water is removed (such as by electron flux) electron yield of each emissive surface increases acutely. Compensatory materials typically have relatively low electron-negativity and/or a relatively low electron affinity, and include diamond; diamond-like carbon; boron doped diamond; boron doped diamond-like carbon, and hydrogen terminated variants of each.

A candidate material may be tested for responsiveness to water in terms of secondary electron yield and/or gain and/or work function. For example, all dynodes of a discrete dynode electron multiplier configured for use in a standard mass spectrometer may be replaced by dynodes having surfaces of the candidate material. The mass spectrometer may be operated normally, with gain being monitored over time. Where the candidate material is responsive to the presence and absence of water in the near vacuum around the electron multiplier, acute gain instability will be noted due to the removal of residual water or about the dynodes due to electron flux. Where the gain instability manifests as an increase in signal output by the electron multiplier in response to a constant input then the candidate material may be considered as positively responsive to the removal of water. By contrast, where the gain instability manifests as a decrease in signal output by the electron multiplier in response to a constant input then the candidate material may be considered as negatively responsive to the removal of water.

As discussed supra, in designing an electron multiplier having improved acute gain stability, the use of one type of electron emissive surface compensates for another. In that regard, the same test conditions and equipment described in the immediately preceding paragraph would be used to identify another material that is useful as a compensatory dynode. Using the same test conditions and equipment allows for a quantitative comparison to be made between the two dynode materials. A quantitative comparison may reveal that one dynode only partially compensates for another dynode thereby requiring the two dynodes to be used at a given ratio in an electron multiplier so as to provide the best possible compensatory effect and diminish acute gain instability.

Selection of a material for use as a compensatory surface may be guided by a consideration of work function. One electron emissive surface may be chosen on the basis of a work function that increases after removal of water, and another compensatory surface chosen on the basis of a work function that decreases after removal of water. Whilst not a strict rule, work function tends to be lower for metals having a more open lattice structure, and higher for metals having closely packed atoms. Furthermore, work function may be higher for crystal faces of high density as compared with more open crystal faces.

Where the electron emissive surface is formed by a metal, the valence bands are occupied with electrons up to the Fermi energy ($E_F$). Work function ($\Phi$) corresponds to the minimum amount of energy needed to remove an electron from the metal. The energy difference between $E_F$ and vacuum level corresponds to the work function of the metal. In metals, work function and ionization energy are the same. The work function of a surface in a metal is strongly affected by the condition of the surface, and in that regard alterations in condition may be exploited so as to alter the work function of an electron emissive surface having, for example, minute amounts of a contaminant (less than a monolayer of atoms or molecules), or the occurrence of surface reactions (oxidation or similar) can substantially alter work function. Changes of the order of 1 eV can be shown for metals and semiconductors, depending on the surface condition. These changes are caused by the generation of electric dipoles at the surface, which in turn alter the energy required by a secondary electron to exit the surface and into the vacuum.

Where the electron emissive surface is formed from a semi-conducting material valence bands and conduction bands are separated by the band gap ($E_g$). In moderately doped materials, the Fermi level is located within the band gap. Accordingly the work function in a semi-conductor is different to the ionization energy. In a semi-conductor, the Fermi level exists only theoretically since there are no allowed electronic states within the band gap, and accordingly the Fermi distribution is relevant to any determination of work function.

As will now be clear, the emissive surface may be fabricated from a material which allows for customization so as to alter the gain and/or secondary electron yield and/or work function in response to the presence or absence of water. The customization may change work function to the extent that a secondary electron yield and/or gain is increased or decreased in response to water. In addition or alternatively the customization may change the magnitude of a secondary electron yield and/or gain of a material. In this way, a material (or at least the surface of a material) can be engineered to closely compensate for another surface in an electron multiplier.

Modifications of materials for use as a compensatory electron emissive surface can be followed by testing for work function before and after a modification. Furthermore, work function alterations due to the presence or absence of water may be assessed to provide an indication at least of the potential for a material to be compensatory of another. Work function may be determined by, for example, photoemission spectroscopy with a Kelvin probe by methods well understood by the skilled artisan.

Carbon-based or silicon-based materials are contemplated to be capable of customization with regard to gain and/or secondary electron yield and/or work function. For example, an electron emissive surface may be formed from a carbon-based layer such as a diamond layer or a diamond-like carbon layer. As used herein, the term "diamond" includes the diamond allotrope of pure carbon, being carbon atoms bonded into a tetrahedral network via $sp^3$ orbitals. As will be detailed infra, a diamond layer may be doped with an impurity to modulate gain and/or secondary electron yield and/or work function, and in that regard would not be considered a "pure" diamond.

It is contemplated that the carbon-based layer may be formed from a diamond-like carbon. As known to the skilled artisan diamond-like carbon materials comprise appreciable levels of $sp^3$ hybridised carbon atoms, and accordingly these materials have many similarities to the diamond allotrope of pure carbon having purely $sp^3$ bonding. Some forms of diamond-like carbon are capable of emitting secondary electrons, tetrahedral amorphous carbon (ta-C) being one such example.

The carbon-based layer may doped to modulate gain and/or secondary electron yield and/or work function. The dopant atom substitutes for carbon in the diamond lattice, thereby donating a hole into the valence band. The level of dopant used may be arrived at by the skilled person having regard to the final gain and/or secondary electron yield and/or work function required for the material to function efficiently as an electron emissive surface and also function as a compensatory surface for another surface.

The dopant type and concentration alters the transport of secondary electrons through the layer bulk, in addition to the electrical conductivity required to replace the secondary electrons emitted. In one embodiment of the first aspect, the dopant is a p-type dopant (preferably boron), but may in other embodiments be n-type (such as nitrogen). The dopant may be boron or nitrogen, but is preferably boron. Where boron is the dopant, concentrations of greater than $10^{19}$ $cm^{-3}$ may be useful. Greater levels of electrical conductivity will be seen where boron is used at a concentration of greater than $10^{20}$ $cm^{3}$, or greater than $10^{21}$ $cm^{-3}$, or greater than $10^{22}$ $cm^{-3}$.

The carbon-based layer may have a crystalline structure. For example, the layer may have a polycrystalline, nano-crystalline, ultra-nano-crystalline, or single crystalline structure. In one embodiment of the invention, the layer comprises grain sizes at the nano- (1 to 100 nm) and/or ultra-nano (less than 5 nm) scales.

Layers may be formed from polycrystalline diamond having an average or median grain size of between about 1 nm and about 1000 nm. As will be appreciated, given the heterogenous nature of polycrystalline materials a range of grain sizes will be found in any given sample. In other embodiments, median grain size may be greater than about 1 μm, and may be up to about 10 μm, 20 μm, 30 μm, 40 μm, 50 μm, 60 μm, 70 μm, 80 μm, 90 μm or 100 μm.

The carbon-based layer may be of any thickness, however maximum thickness may be dictated by ease of fabrication or considerations of economy.

The carbon-based layer may have a thickness of between about 1 nm and about 500 nm, or between about 1 nm and about 100 nm. Where the carbon-based layer is formed from nanocrystalline diamond, the layer thickness may be greater than 10 μm.

In terms of fabrication, the carbon-based layer may be formed by a growth process on a substrate. In the context of the present invention, the term "growth" means that the layer is not preformed separately and then applied to the substrate. Instead, the carbon-based layer is grown on the substrate in situ, such that the thickness of the layer increases during the growing process.

The growth process may be a deposition process. For example, growth may be achieved by a vapour deposition process. This method is reliant on the coating material being presented to the substrate in a vapour state and deposited via condensation, chemical reaction, or conversion. Examples of vapour deposition methods include physical vapour deposition (PVD) and chemical vapour deposition (CVD). In PVD, the substrate is subjected to plasma bombardment. In CVD, thermal energy heats gases in a coating chamber, driving the deposition reaction. Vapour deposition methods are usually performed within a vacuum chamber.

The vapour deposition method is a physical vapour deposition method, which may be a plasma-based method, or a sputtering method (such as a high power impulse magnetron sputtering method).

Physical vapour deposition methods are typically reliant on dry vacuum deposition in which a coating material is deposited over the substrate. Reactive PVD hard coating methods generally require a method for depositing the material, an active gas (such as nitrogen, oxygen, or methane), and plasma bombardment of the substrate.

Sputtering alters the physical properties of a surface. In this process, a gas plasma discharge is provided between a cathode coating material and an anode substrate. Positively charged gas ions are accelerated into the cathode. The impact displaces atoms from the cathode, which then impact the anode and coat the substrate. A film forms on the substrate as atoms adhere to the substrate. Three techniques for sputtering are available to the skilled person for potential use in the present invention: diode plasmas, RF diodes, and magnetron-enhanced sputtering.

The steps in a typical CVD process are as follows: generation of the reactive gas mixture, transport of reactant gas to the surface to be coated, adsorption of the reactants on the surface to be coated, and reaction of the adsorbents to form the coating.

To explain further, the reactant gas mixture is contacted with the substrate. The coating material is delivered by a precursor material (termed a reactive vapour) which may be dispensed as a gas, liquid, or in solid phase. The gases are fed into a chamber under ambient pressures and temperatures while solids and liquids are provided at high temperature and/or low pressure. Once resident in the chamber, energy is applied to the substrate surface to facilitate the coating reaction with the carrier gas.

Pre-treatment of the substrate surface is generally required in vapour deposition methods, and particularly in CVD. Mechanical and/or chemical means may be used before the substrate enters the deposition reactor. Cleaning is typically effected by ultrasonic cleaning and/or vapour degreasing. To facilitate adhesion of the coating, vapour honing may be used. During the coating process, surface cleanliness is maintained to prevent particulates from entering in the coating. Mild acids or bases may be used to slough oxide layers which may have formed during the heat-up step. Post-treatment of the coating may include exposure to heat to cause diffusion of the coating material across the surface.

In the exemplary embodiment, CVD was implemented in the presence of a hydrogen plasma so as to inhibit growth of graphitic carbon bonds. Nanodiamond particles were firstly dispersed onto the substrate, and the polydiamond grown from the particles.

The coating material is deposited on the substrate surface by a thermal spray method, including a combustion torch method, a flame spraying method, a high velocity oxy fuel method, a detonation gun method, an electric arc spraying method and a plasma spraying method. Nanocrystalline-diamond particles may be produced in the form of a coating by depositing Ni-clad graphite powder in a high-velocity thermal spray method. Particles are accelerated to impact and form a film on a metal substrate. Electron microscopy reveals that the deposited layer contains cubic diamond nanocrystals having a size range of 5 to 10 nm.

There exists three basic categories of thermal spray technologies: combustion torch methods (including flamespray, high-velocity oxy fuel, and detonation gun methods), electric (wire) arc methods, and plasma arc methods.

Flame spraying methods involve feeding gas and oxygen through a combustion flame spray torch. The layer material is fed into the flame. The layer material is heated to about or higher than its melting point, and then accelerated by combustion of the layer material. The so-formed molten droplets flow on the surface to form a continuous and even coating.

High-velocity oxy fuel (HVOF) methods require the layer material to be heated to a temperature of about or greater than its melting point, and then deposited on the substrate by a high-velocity combustion gas stream. The method is typically carried out in a combustion chamber to enable higher gas velocities. Fuels used in this method include hydrogen, propane, or propylene.

Plasma spraying relies on introduction of a flow of gas (typically argon) between a water-cooled anode and a cathode. A direct current arc passes through the gas stream causing ionization and the formation of a plasma. The plasma heats the layer material (in powder form) to a molten state. Compressed gas directs the material onto the substrate.

Other methods of diamond growth include high pressure high temperature (HPHT); detonation; and ultrasound cavitation methods.

The carbon-based layer may be formed by growth on a substrate is subjected to post-growth modification. The modification may be effected to improve any mechanical, physical, chemical, electrical, thermal, or other property of the grown layer as required or desired. In one embodiment of the first aspect, the post-growth modification creates a negative electron affinity of at least a portion of the carbon atoms of the carbon-based layer. A very low or even negative electron affinity at the layer surface permits low-energy quasi-thermalized electrons to reach the surface and escape into the surrounding vacuum.

In some embodiments the post-growth modification causes termination of the carbon atoms of the carbon-based layer. The termination may be effected by hydrogen, fluorine or an alkali earth metal such as caesium. As will be appreciated, some termination atoms will be preferred over others when having regard to the desired end result of a certain gain and/or secondary electron yield and/or work function.

After chemical vapour deposition of diamond, the surface may be naturally terminated by hydrogen at least to some extent, and accordingly no specific steps need be taken to effect termination.

However, where termination is required (or greater levels of termination are desired) then active steps may be taken to effect termination. For example, where hydrogen termination is required this may be achieved using atomic hydrogen produced by either plasma or hot filament techniques as known to the skilled artisan. In one embodiment of the first aspect, the post-growth modification is by exposure of the carbon-based layer to a gas plasma (typically hydrogen gas).

Alternative methods use high temperature molecular hydrogen to hydrogenate the surface of diamond films, even at atmospheric pressure. Hydrogen termination of chemical vapour deposited diamond films may be due to the formation of surface carbon dangling bonds and carbon-carbon unsaturated bonds at the applied temperature, which are reactive with molecular hydrogen to produce a hydrogen-terminated surface.

Where the electron emissive layer is exceedingly thin, mechanical support may be required. The substrate may provide other structural or functional effects.

While non-conductors (such as silicon) are capable of having microcrystalline diamond layered thereon, for applications in electron multipliers electrical conductivity is required. In that regard, a non-conducting substrate may nevertheless be used, and the carbon-based layer electrically connected to a power source. The substrate may be a metal or metal alloy such as nickel or steel. In other embodiments the metal is a transition metal, and may be a second row or third row transition metal such as molybdenum, or tungsten.

In one embodiment, the electron multiplier has emissive surfaces fabricated from standard materials (such as standard dynode materials) with other emissive surfaces fabricated from materials that compensate for the acute gain effects caused by the removal of water from the standard surfaces. Ideally, the compensatory materials have secondary electron yields similar to the standard emissive materials. This allows for compensation to be added without modifying other aspects of multiplier performance. Where such an arrangement is not possible, the benefits of compensation will be balanced against the need to make changes to other areas of electron multiplier performance.

A further consideration when designing an electron multiplier having compensatory electron emissive surfaces is the effect of persistent gain instability, or "ageing", on the compensation. Persistent, long-term gain instability is the result of carbon compounds being chemically bonded, or "stitched", onto an electron multiplier's emissive surfaces. Accordingly, an electron multiplier's configuration of emissive materials changes with use. Applicant has found that secondary electron yield of stitched material increases when water molecules are on the surface. This means that emissive surfaces coated with a compensatory material may provide less compensation as the electron multiplier ages. Importantly, the surfaces will not simply decline towards provide zero compensation, but will eventually provide 'negative' compensation if sufficient carbon compounds are stitched to them. When designing compensation for an electron multiplier, it will therefore be typically necessary to determine a point in the operational life for which the optimum compensation is provided (and therefore best acute gain stability), or alternatively balance the compensation across the life of the electron multiplier.

A meta-material approach (as described further infra) may be advantageous when designing compensation that accounts for ageing. Stitching is most prevalent at the locations of electron impacts. An emissive surface may be coated with a mixture of standard emissive materials and compensatory materials, the relative amounts of each being optimised based on the electron impact distribution. The composition for heavily impacted regions may be designed for operation in the initial, pristine condition of the emissive surface. The composition of lightly impacted regions may be designed for a carbon stitched emissive surface. As different emissive surfaces experience different electron impact fluxes, and even different impact distributions, the meta-material coating on each emissive surface can be optimised accordingly.

Additionally, electron flux and electron impact distributions change with applied operating voltage, and these parameters may be factored into the design of a meta-material coating of each emissive surface. As the applied operating voltage is increased in response to ageing, this provides another method of designing compensation while considering ageing.

There are proposed three generic embodiments of an electron multiplier that incorporates compensatory materials to achieve compensation. The first of the three generic embodiments is to use a single material on each emissive surface, but to vary the permutation and/or combination of emissive surface surfaces to achieve the desired compensation. The second of the three generic embodiments is to use a 'meta-surface' on one or more emissive surfaces. Each meta-surface is a mixture of one or more materials on an individual emissive surface. The third of the three generic embodiments is to combine the first two embodiments of the three generic embodiments.

In the first of the three generic embodiments, a single material is used on each emissive surface. This approach relies on physically distinct emissive surfaces. As such, this first embodiment is most useful and easily implemented using a discrete dynode electron multiplier. Each dynode in this type of electron multiplier is a distinct physical unit. Each dynode can easily be coated with an individual material. By varying the combination and permutation of dynode surfaces, the amount of compensation can be set to reduce or overcome acute gain instability. More finely "tunable" compensation can be achieved in detectors that are constructed using more dynodes.

The first of the three generic embodiments may also be implemented in multi-channel CEMs. A different emissive material, or meta-material combination surface, can be used in each channel of a multi-channel CEM. This implementation is less desirable however than discrete dynode detectors. An impacting ion only generates an event in a single channel. Compensation therefore only occurs 'on average' as ions impact all the channels. This will create an ion current dependent level of compensation. In some applications this will not present any significant problem, and this will be a useful embodiment of compensation.

In the second of the three generic embodiments, the composition of individual emissive surfaces are varied, so that they are a mix of one or more standard emissive materials and one or more compensatory materials. Several types of electron multipliers are well suited to this embodiment. They are: electron multipliers that only use a single surface, such as channel electron multipliers; electron multipliers that only use several or less surfaces, and rely on a single large surface for amplification, such as a magneTOF™, micro magneX™ or a multi-channel channel electron multiplier, and electron multipliers constructed such that their multiple surfaces can't be individually coated easily, such as micro channel plates (MCPs).

It will be noted that when not used in time-of-flight applications, an MCP is almost functionally equivalent to a channel electron multiplier. As such, when not used in time-of-flight applications, MCPs typically operate analogously to a channel electron multiplier, by amplifying a single impacting ion using a single channel. In which case, MCP are well suited for this second of the three generic embodiments. Correspondingly, any time-of-flight application that covers a wide dynamic range must consider the case of low ion input currents, which is functionally equivalent to non-time-of-flight applications. This is the reason why even if a suitable method was developed to construct MCPs in the style of the first of the three generic embodiments, the second of the three generic embodiments is superior. There may exist some applications, such as with multi-channel CEMs, for which this is not an issue. In these instances an MCP can implement compensation using the first of the three generic embodiments.

The second of the three generic embodiments allows for customization of the composition of the emissive surface as a function of location on the emissive surface. The amount of compensation of an individual emissive surface may be varied according to the expected incident electron flux. The electron flux to which emissive surfaces are exposed varies with the operating voltage applied to the electron multiplier. The operating voltage applied to an electron multiplier is increased as it ages, to compensate for decreasing secondary electron yields of the emissive surfaces over time. The second embodiment; therefore, provides an indirect mechanism for controlling the amount of compensation that is applied as a detector ages. This allows for the compensation to be designed so as to take into account the effect of carbon compounds being stitched to an electron multiplier's emissive surfaces.

Elements of the first and second of the three generic embodiments may be combined to create a third embodiment. Particularly the first embodiment may be modified to use meta-material, combination surfaces instead of emissive surfaces composed of a single material.

A first exemplary embodiment of an electron multiplier is an example of the first of the three generic embodiments. In this electron multiplier, the first N dynodes are coated with compensatory materials, and the remainder with standard emissive materials.

A second exemplary embodiment of an electron multiplier is the complement to the first exemplary embodiment. In this electron multiplier, the first N dynodes are coated with standard emissive materials, and the remainder with compensatory materials.

A third exemplary embodiment of an electron multiplier is an example of the first of the three generic embodiments. In this electron multiplier, the dynodes alternate between standard emissive materials, and compensatory materials.

A fourth exemplary embodiment of an electron multiplier is an example of the first of the three generic embodiments. In this electron multiplier, the dynodes are arranged in alternating blocks of standard emissive materials and compensatory materials.

A fifth exemplary embodiment of an electron multiplier is an example of the second of the three generic embodiments. This fifth embodiment is a CEM that uses a gradient of a standard emissive surface materials and a compensatory material.

A sixth exemplary embodiment an example of the second of the three generic embodiments. This is a discrete dynode electron multiplier that uses a fixed mixture of standard emissive surface material and compensatory surface material on every dynode emissive surface.

A seventh exemplary embodiment is an example of the second of the three generic embodiments. This is a discrete dynode electron multiplier that uses a positionally varying mixture of standard emissive surface material and compensatory surface material on every dynode emissive surface. Each dynode has a custom composition (i.e. ratio of standard and compensatory materials), because each is exposed to a different level of electron flux over the operating life of the electron multiplier. Typically, dynodes positioned around the start in the multiplication chain are exposed to significantly less electron flux than those positioned around the end of the chain.

An eighth exemplary embodiment is an example of the third of the three generic embodiments. The first N dynodes in this electron multiplier are each coated with an identical combination of a standard emissive material and a compensatory material at a fixed ratio.

A ninth exemplary embodiment is an example of the third of the three generic embodiments. The dynodes in this electron multiplier are organized into groups. Each group uses a different combination of standard emissive materials and compensatory materials.

The avoidance of acute gain instability in an electron multiplier may provide for one or more ancillary benefits for users:

Reduced system down time.

Less frequent calibration required.

Reduced operating expenses.

Easier integration of detector into new mass spectrometry systems.

Easier management of detector operation by mass spectrometry systems.

Reduced time, operational and financial penalties for venting a mass spectrometer, or otherwise exposing the electron multiplier to atmosphere.

Reduced wastage of samples and calibrants.

The present invention will now be further described by reference to the following non-limiting example.

Example 1: Water Molecules Present on Electron Emissive Surfaces of an Electron Multiplier Modifies Secondary Electron Yield Thereby Causing Acute Gain Instability Applicant proposes that water molecules present on the emissive surfaces of electron multipliers modifies the secondary electron emission yield of the surfaces. Even small changes in the secondary electron yield of each emissive surface can result in significant changes in the gain of the electron multiplier as a whole because of the geometric compounding of the secondary electron yield (or gain) from each surface. The effect is proposed to be of short term effect so as to account for the acute nature of gain instability seen empirically in electron multipliers of the prior art, because either the impact of electrons and/or the emission of secondary electrons removes water molecules from the surfaces of the emissive materials. This mechanism predicts that the effect will be largest initially, when the most water is present and accordingly most water is removed. As such, the size of the effect is predicted to diminish increasingly slowly. It is proposed therefore that acute gain instability due to water effects will follow a monotonic regression to the long-term gain instability or "ageing" of the electron multiplier.

An experiment was conducted to confirm the proposal above. Two electron multipliers were placed in a vacuum chamber and operated for extended periods until acute gain stability was no longer evident. The two electron multipliers were then exposed to varying levels of atmosphere before being operated for a further extended period. Three levels of atmospheric exposure were used in this experiment: (i) a 'delay' level, in which the electron multipliers were stopped operating but maintained under vacuum; (ii) a 'vent' level, in which the chamber was vented to atmospheric pressure and the electron multipliers were remained in the chamber, and an 'exposure' level, in which the detectors were completely removed from the chamber. The results of this experiment are shown in FIG. 2.

Figure 2:
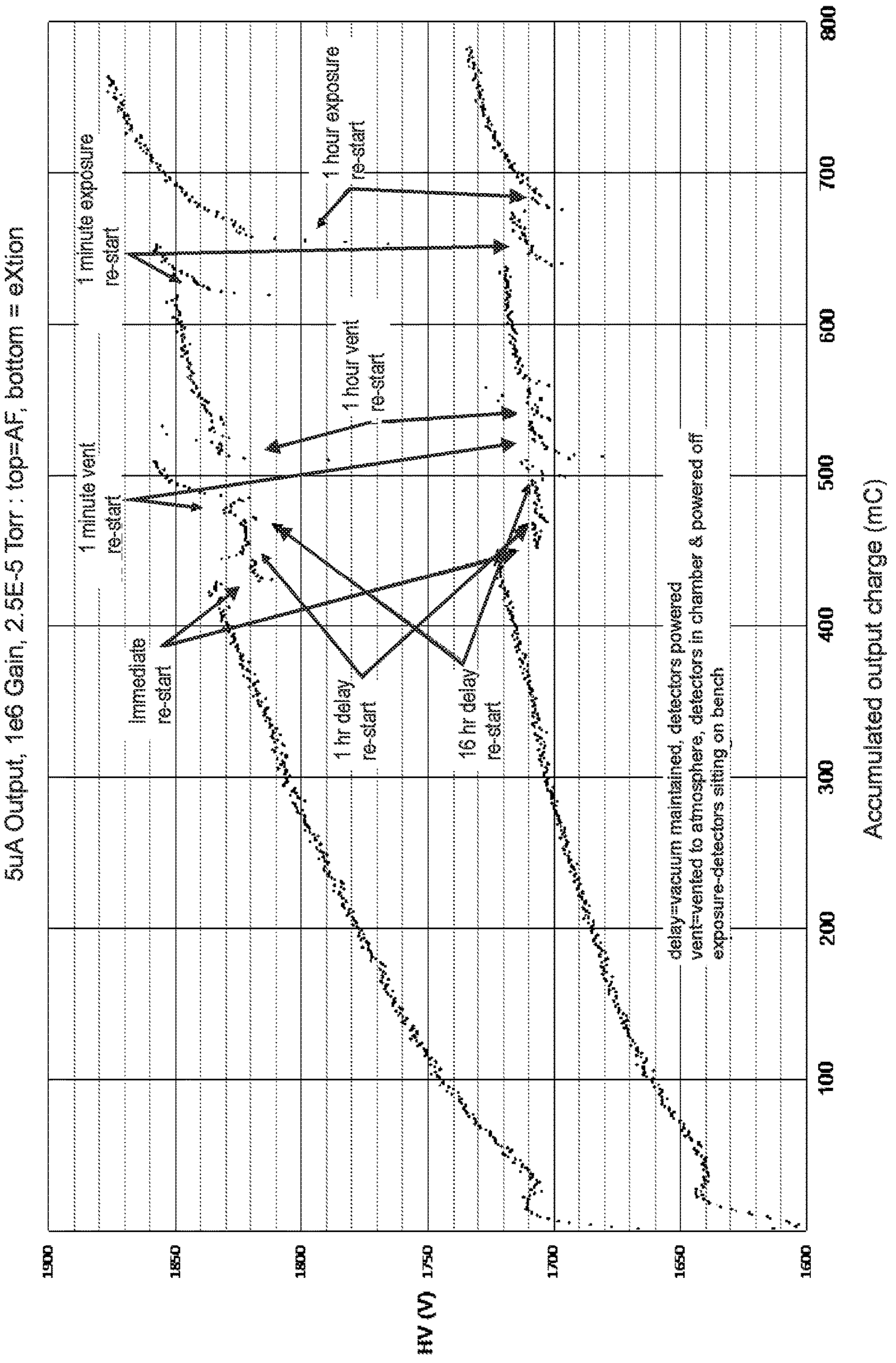
FIG. 2 is a graph of experimental data demonstrating repeated acute gain instability in an electron multiplier due to exposure to atmospheric water. Each data point is separated in time by 10 minutes. The upper data series was obtained from a standard ETP™ AF multiplier/detector. The lower data series was obtained from an ETP™ AF multiplier detector of the eXtion™ range.

The results in FIG. 2 are consistent with Applicant's proposal that removal of water from electron emissive surfaces in an electron multiplier is the cause of acute gain instability. As shown in FIG. 2 the acute gain instability demonstrated a monotonic regression to the persistent, long-term gain instability or "ageing". This plot also shows acute gain instability severity, increasing with the detectors' exposure level to the atmosphere (and therefore atmospheric water).

Based on the experimental data presented in FIG. 2, it can be concluded that water molecules present in the atmosphere are one of the causes of acute gain instability, by temporarily modifying the secondary electron yield of the multiplier's emissive surfaces. As such, it is possible to eliminate, or at least mitigate, both the severity and occurrences of acute gain instability, by designing an electron multiplier to compensate for the presence of water molecules on emissive surfaces.

Those skilled in the art will appreciate that the invention described herein is susceptible to further variations and modifications other than those specifically described. It is understood that the invention comprises all such variations and modifications which fall within the spirit and scope of the present invention.

While the invention has been disclosed in connection with the preferred embodiments shown and described in detail, various modifications and improvements thereon will become readily apparent to those skilled in the art.

Accordingly, the spirit and scope of the present invention is not to be limited by the foregoing examples, but is to be understood in the broadest sense allowable by law.

The invention claimed is:

1. An electron multiplier having:

two or more electron emissive surfaces, a first of the two or more electron emissive surfaces having a first composition, a second of the two or more electron emissive surfaces having a second composition, wherein the first and second compositions differ so as to together limit or overcome an acute gain effect on the electron multiplier due to exposure of the two or more electron emissive surfaces to water molecules, and/or a single electron emissive surface of mixed composition comprising a first composition component and a second composition component, wherein the first and second composition components differ so as to together limit or overcome an acute gain effect on the electron multiplier due to exposure of the electron emissive surface to water molecules, and wherein the first and second compositions differ in a manner such that when the two or more electron emissive surfaces are exposed to water molecules the secondary electron yield of the first electron emissive surface increases, and the secondary electron yield of the secondary electron emissive surface decreases, and/or wherein the first and second composition components differ in a manner such that when the single electron emissive surface is exposed to water molecules the secondary electron yield contributed by the first composition component increases and the secondary electron yield of the second composition component decreases.

2. The electron multiplier of claim 1, wherein a magnitude of the increase and a magnitude of the decrease in secondary electron yields of the first and second electron emissive surfaces respectively lessens or cancels the acute gain effect of the electron multiplier due to exposure of the first and second electron emissive surfaces to water molecules, and/or wherein a magnitude of the increase and a magnitude of the decrease in secondary electron yields of the first and second composition components respectively lessens or cancels the acute gain effect of the electron multiplier due to exposure of the first and second composition components to water molecules.

3. The electron multiplier of claim 1, wherein in the absence of water molecules a secondary electron yield of the first and second electron emissive surfaces are about equivalent, and/or wherein in the absence of water molecules a secondary electron yield of the first and second composition components are about equivalent.

4. The electron multiplier of claim 1, wherein in the absence of water molecules the secondary electron yield of the first and second electron emissive surfaces are about equivalent, and/or wherein in the absence of water molecules the secondary electron yield contribution of the first and second composition components are about equivalent.

5. The electron multiplier of claim 1, wherein the first composition has a high electron negativity and/or a high electron affinity as compared with the second composition, and/or wherein the first composition component has a high electron negativity and/or a high electron affinity as compared with the second composition component.

6. The electron multiplier of claim 1, wherein the first composition and/or the first composition component comprises a stainless steel, aluminium, beryllium copper, gold or another metal or an oxidized silicon-based glass or other silicon-based glass.

7. The electron multiplier of claim 1, wherein the second composition and/or the second composition component comprises a semiconductor including diamond, or a diamond-like carbon, or another non-metal.

8. The electron multiplier of claim 1, wherein the second composition has a low electron negativity and a low electron affinity as compared with the first composition; and/or the second composition component has a low electron negativity and a low electron affinity as compared with the first composition component.

9. The electron multiplier of claim 7, wherein the semiconductor, the diamond, the diamond-like carbon or the another non-metal is doped with a doping agent and/or hydrogen-terminated.

10. The electron multiplier of claim 9, wherein the doping agent comprises boron.

11. The electron multiplier of claim 1, configured as a discrete dynode electron multiplier, wherein the first electron emissive surface is provided by a first dynode and the second electron emissive surface is provided by a second dynode.

12. The electron multiplier of claim 11, comprising a plurality of dynodes wherein a ratio of first emissive surfaces to second emissive surfaces is set so as to limit or overcome an acute gain effect on the electron multiplier due to exposure of the electron emissive surface to water molecules.

13. The electron multiplier of claim 1, configured as a multi-channel electron multiplier, wherein the first electron emissive surface is provided by a first channel and the second electron emissive surface is provided by a second channel.

14. The electron multiplier of claim 13, comprising a plurality of channels wherein a ratio of first emissive surfaces to second emissive surfaces is set so as to limit or overcome an acute gain effect on the electron multiplier due to exposure of the electron emissive surface to water molecules.

15. The electron multiplier of claim 1, configured to amplify a signal using one, two or several electron emissive surfaces, wherein each of the one, two or several electron emissive surfaces comprises the first composition component and the second composition component.

16. The electron multiplier of claim 15, wherein a ratio of the first composition component to the second composition component is set so as to limit or overcome an acute gain effect on the electron multiplier due to exposure of the electron emissive surface(s) to water molecules.

17. An electron multiplier having:

two or more electron emissive surfaces, a first of the two or more electron emissive surfaces having a first composition, a second of the two or more electron emissive surfaces having a second composition, wherein the first and second compositions differ so as to together limit or overcome an acute gain effect on the electron multiplier due to the exposure of the two or more electron emissive surfaces to water molecules, and/or a single electron emissive surface of mixed composition comprising a first composition component and a second composition component, wherein the first and second composition components differ so as to together limit or overcome an acute gain effect on the electron multiplier due to the exposure of the electron emissive surface to water molecules, and wherein the first and second compositions differ in a manner such that when the two or more electron emissive surfaces are exposed to water molecules the work function of the first electron emissive surface decreases, and the work function of the second electron emissive surface increases, and/or wherein the first and second composition components differ in a manner such that when the single electron emissive surface is exposed to water molecules the work function component contributed by the first composition component decreases and the work function of the second composition component increases.

18. The electron multiplier of claim 17, wherein the magnitude of the decrease and the magnitude of the increase in work functions of the first and second electron emissive surfaces respectively lessens or cancels the acute gain effect of the electron multiplier due to exposure of the first and second electron emissive surfaces to water molecules, and/or wherein the magnitude of the decrease and the magnitude of the increase in secondary electron yields of the first and second composition components respectively lessens or cancels the acute gain effect of the electron multiplier due to exposure of the first and second composition components to water molecules.

19. The electron multiplier of claim 17, wherein in the absence of water molecules the work functions of the first and second electron emissive surfaces are about equivalent, and/or wherein in the absence of water molecules the work function contribution of the secondary electron yield of the first and second composition components are about equivalent.

20. The electron multiplier of claim 17, wherein the first composition has a high electron negativity and/or a high electron affinity as compared with the second composition, and/or wherein the first composition component has a high electron negativity and/or a high electron affinity as compared with the second composition component.

* * * * *